(12) United States Patent
Chevrette et al.

(10) Patent No.: US 7,484,927 B2
(45) Date of Patent: Feb. 3, 2009

(54) STEAM TURBINE VARIABLE CLEARANCE PACKING

(75) Inventors: Richard J. Chevrette, Troy, NY (US); Flor Rivas, Clifton Park, NY (US); Frederick G. Baily, Ballston Spa, NY (US); William E. Adis, Scotia, NY (US); Mark E. Kelly, Alplaus, NY (US); Bernard A. Couture, Schenectady, NY (US); Kurt N. Laurer, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 11/404,956

(22) Filed: Apr. 14, 2006

(65) Prior Publication Data
US 2007/0243062 A1 Oct. 18, 2007

(51) Int. Cl.
*F04D 29/10* (2006.01)

(52) U.S. Cl. .............. 415/113; 415/174.2; 416/196 R

(58) Field of Classification Search .............. 415/113, 415/170.1, 174.1, 174.2; 416/196 R; 277/411–413
See application file for complete search history.

(56) References Cited

U.S. PATENT DOCUMENTS

| | | | | |
|---|---|---|---|---|
| 3,584,010 A | * | 6/1971 | Wart | 549/430 |
| 3,854,843 A | * | 12/1974 | Penny | 415/197 |
| 3,971,563 A | * | 7/1976 | Sugimura | 277/413 |
| 5,464,226 A | * | 11/1995 | Dalton | 277/412 |
| 5,503,405 A | | 4/1996 | Jewett et al. | 277/53 |
| 6,022,027 A | * | 2/2000 | Chevrette et al. | 277/413 |
| 6,145,844 A | * | 11/2000 | Waggott | 277/412 |
| 6,572,114 B1 | * | 6/2003 | Magoshi et al. | 277/411 |
| 6,715,766 B2 | * | 4/2004 | Kirby et al. | 277/416 |

* cited by examiner

*Primary Examiner*—Igor Kershteyn
(74) *Attorney, Agent, or Firm*—Cantor Colburn LLP

(57) ABSTRACT

Disclosed herein is a packing ring assembly including a packing ring segment, a bar, a cover plate, and a spring. The packing ring segment has an axial slot. The bar is disposed within the slot. The cover plate is disposed along an outer periphery of the packing ring segment. And, the spring is compressed between the bar and the cover plate.

13 Claims, 5 Drawing Sheets

STEAM TURBINE VARIABLE CLEARANCE PACKING

BACKGROUND OF THE INVENTION

This application relates generally to steam turbines, and more specifically, to seals between rotating and stationary components of a steam turbine.

In rotary machines such as turbines, seals are provided between rotating and stationary components. For example, in steam turbines it is customary to provide a plurality of arcuate packing ring segments (sometimes referred to as seal ring segments) to form a labyrinth seal between the stationary and rotating components. Generally, the arcuate packing ring segments are disposed in an annular groove in the stationary component concentric to the axis of rotation of the machine and hence concentric to the sealing surface of the rotating component. Each arcuate seal segment carries an arcuate seal face in opposition to the sealing surface of the rotating component. In labyrinth type seals, the seal faces carry a radially directed array of axially spaced teeth, and which teeth are radially spaced from an array of axially spaced annular teeth forming the sealing surface of the rotating component. The sealing function is achieved by creating turbulent flow of a working media, for example, steam, as it passes through the relatively tight clearances within the labyrinth defined by the seal face teeth and the opposing surface of the rotating component.

The ability to maintain proper clearances without physical contact between the rotating equipment and stationary components allows for the formation of an effective seal. If this radial clearance between the seal faces of the segments and the opposing seal surfaces of the rotating component becomes too large, the flow area increases, less turbulence is produced and the sealing action is compromised. Conversely, if the clearance is too tight, the sealing teeth may contact the rotating element, with the result that the teeth lose their sharp profile and tight clearance and thereafter create less turbulence, and possesses an increased flow area, likewise compromising the sealing action.

In order to avoid damage to the rotor and packing ring segment during transient conditions such as startup and shutdown, positive pressure, variable clearance packing rings are sometimes used. In positive pressure, variable clearance packing rings, the packing ring segments are commonly spring biased into outer or large clearance positions causing the seal faces carried by the packing ring to be spaced substantially outwardly of the rotary component. After start-up, the working fluid medium, e.g., steam, enters the grooves of the stationary component, urging the segments to move inwardly against the bias of the springs, toward the inner or small clearance positions. These springs are located within the annular groove defined by the stationary component, and are sized relative to the annular grooves in which they reside. In large turbine units, the annular groove is typically large enough to accommodate large springs having an elasticity capable of tolerating the pressure-force resulting from inlet of the fluid medium. In addition, the packing ring is typically large enough to allow springs to be affixed to the portion of the packing ring residing in the annular groove.

However, when working with smaller turbine units used in applications such as boiler feed pumps, reactor feed pumps, mechanical drives for compressors and pumps, and some generator drive units, it can become difficult and impractical to install capable springs within the narrow width/diameter annular grooves present in the smaller turbine unit. Thus, in these instances, there is a need for a variable clearance packing ring assembly that can be used in conjunction with annular grooves having too small a width and diameter to accommodate conventional springs.

BRIEF SUMMARY OF THE INVENTION

Disclosed herein is a packing ring assembly including a packing ring segment, a bar, a cover plate, and a spring. The packing ring segment has an axial slot. The bar is disposed within the slot. The cover plate is disposed along an outer periphery of the packing ring segment. And, the spring is compressed between the bar and the cover plate.

Further disclosed herein is a packing ring assembly having a first packing ring segment, a second packing ring segment, and one or more seal keys. The first packing ring segment has a spring loaded bar disposed within a first half of a stationary component. The second packing ring segment has a spring loaded bar disposed within the first half of the stationary component adjacent to the first packing ring segment. And, the one or more seal keys are disposed at a midline between the first half and the second half of the stationary component wherein each of the seal keys supports the first or second packing ring segment.

Yet further disclosed herein is a steam turbine having a shaft, a stationary component, and a packing ring assembly. The components are arranged such that the packing ring assembly extends around the shaft having a spring loaded bar in contact with the stationary component.

BRIEF DESCRIPTION OF THE DRAWINGS

Referring to the drawings wherein like elements are numbered alike in the several Figures.

DETAILED DESCRIPTION OF THE INVENTION

Figure 1:
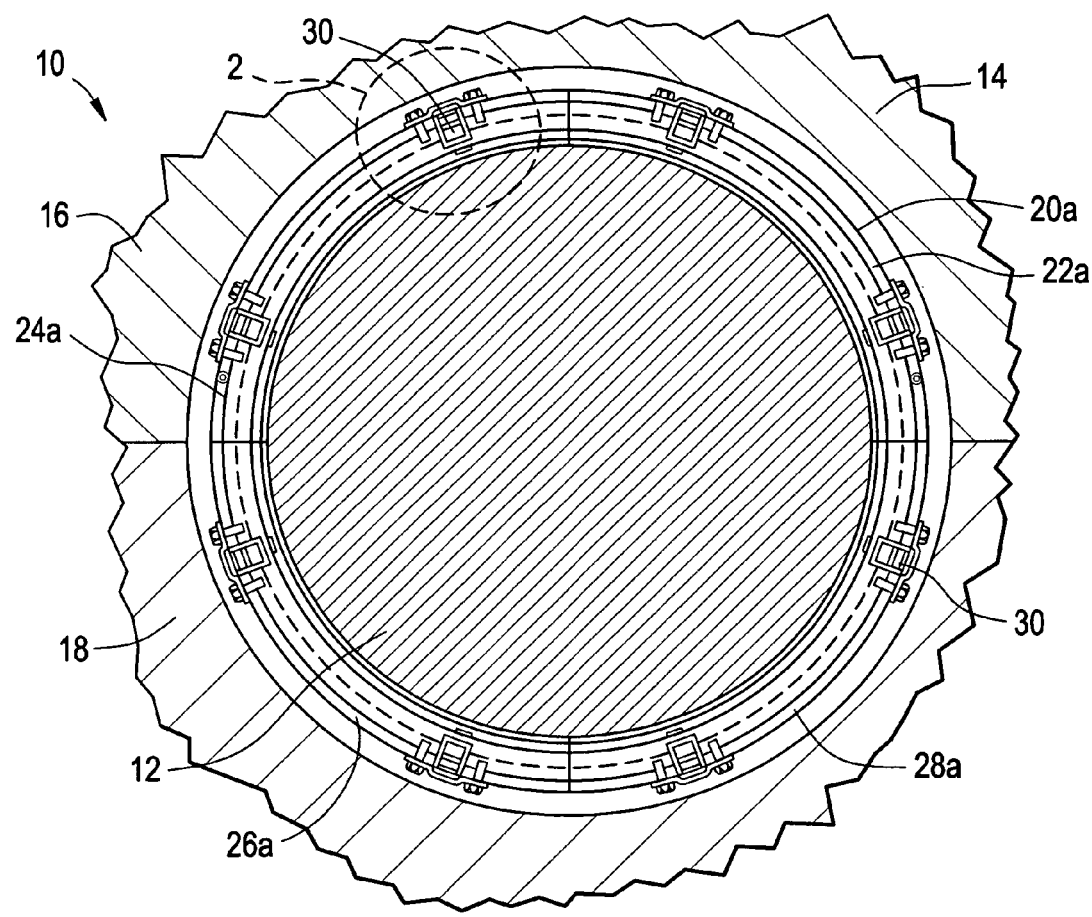
FIG. 1 is a section view of a portion of a steam turbine for use in accordance with an embodiment of the invention.

Referring to FIG. 1, a portion of a steam turbine 10 is illustrated having a turbine shaft 12 disposed in a stationary component, for example a turbine diaphragm 14 comprising first and second diaphragm halves 16 and 18, respectively. A labyrinth seal is provided at the turbine shaft-to-diaphragm interface to prevent leakage. The labyrinth seal includes a variable clearance packing ring assembly 20a, sometimes referred to as a seal ring assembly, as shown in FIG. 1 having four arcuate packing ring segments, 22a, 24a, 26a, and 28a, extending around the turbine shaft 12. The packing ring segments are movable between an outermost large clearance position and an innermost small clearance position about the turbine shaft 12 at startup and at speed operations, respectively.

Figure 2:
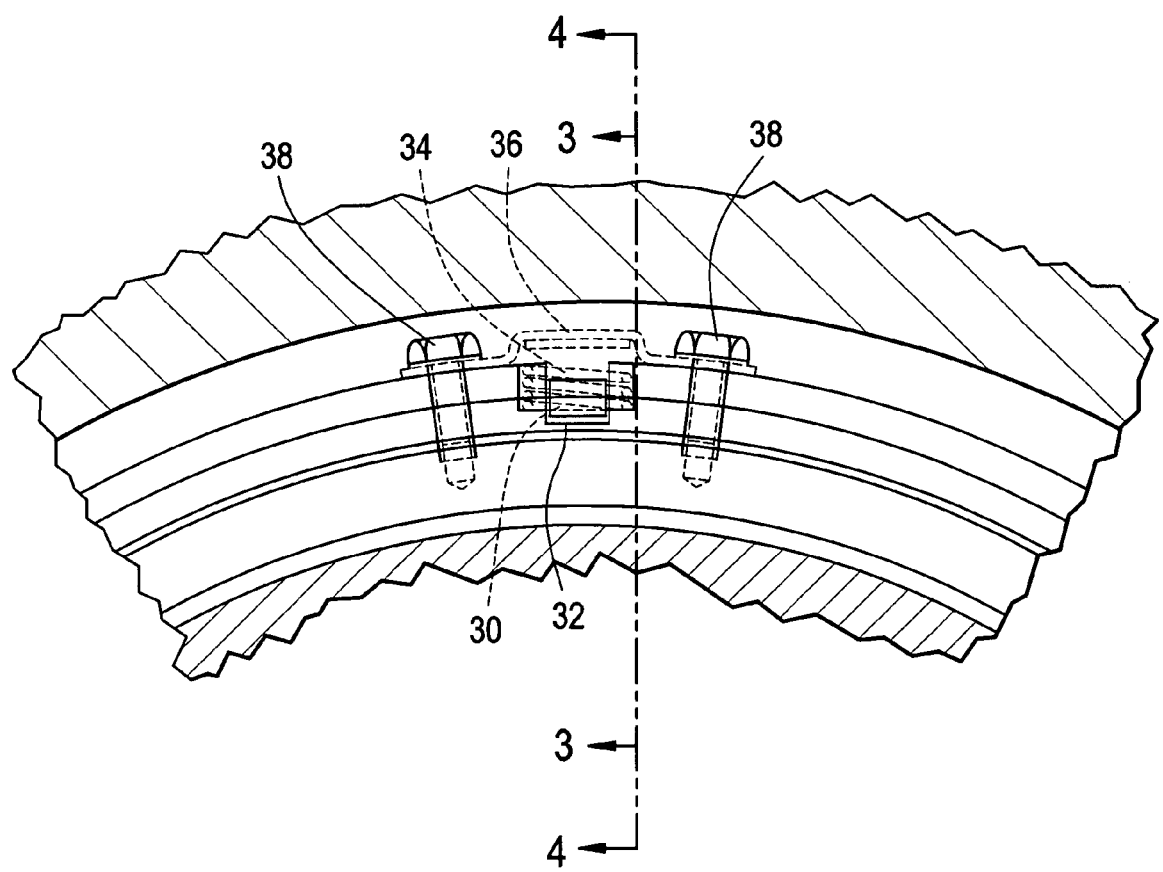
FIG. 2 is an enlarged view of the exemplary steam turbine of FIG. 1 for use in accordance with an embodiment of the invention.

Each of the packing ring segments includes two spring loaded bars 30 (better illustrated in FIG. 2, which is rotated from its position in FIG. 1 for clarity) which allow the packing ring segments to move in a radial direction between a large clearance position and a small clearance position. The spring loaded bar 30 is disposed within an axial slot 32 located along an outer perimeter of the packing ring segment. Further disposed within the axial slot 32 is a spring 34 which contacts the bar 30 on one end and contacts a cover plate 36 on another end. The cover plate 36, which contains the bar 30 and spring 34 within the slot, is secured to the outer periphery of the packing ring segments by fasteners 38.

Figure 3:
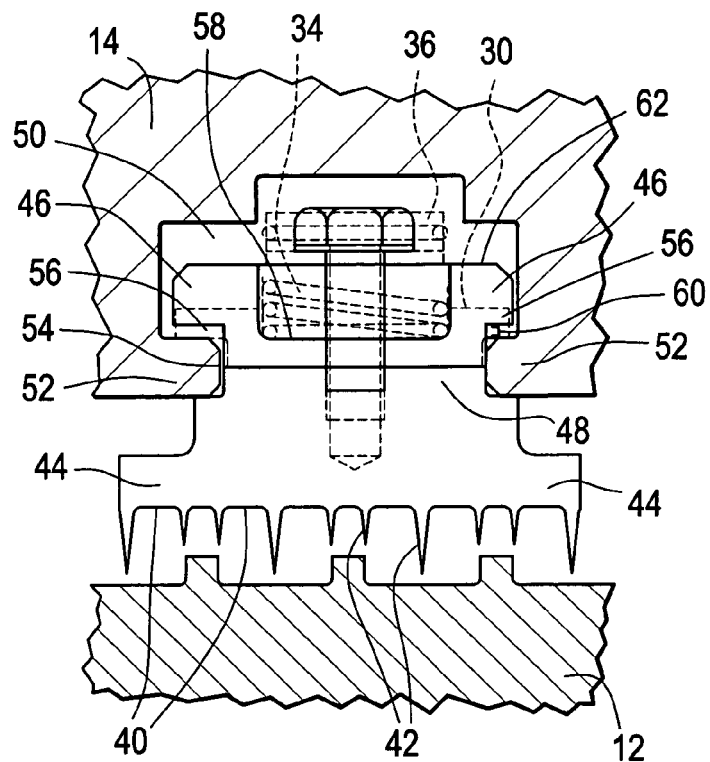
FIG. 3 is a cross-section view of the exemplary steam turbine of FIG. 2 for use in accordance with an embodiment of the invention.
Figure 4:
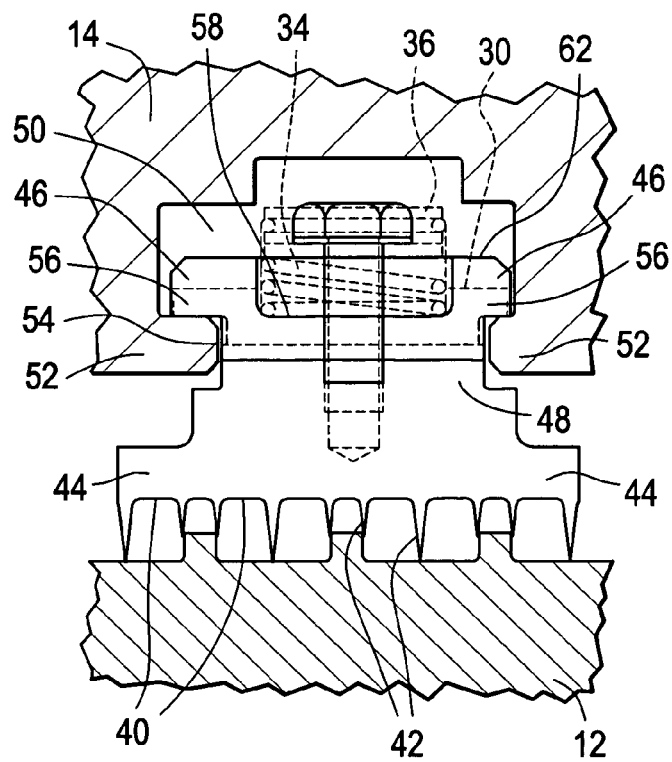
FIG. 4 is a cross-section view of the exemplary steam turbine of FIG. 2 for use in accordance with an embodiment of the invention.

As further illustrated in FIGS. 3 and 4, each packing ring segment has a sealing face 40 and radially projecting teeth 42, each sealing face 40 is formed by a pair of segment sealing flanges 44 extending axially away from one another. The radial outer portions of the packing ring segments include segment locating flanges 46 that similarly extend from the packing ring segment in axially opposite directions away from one another. An axially reduced neck 48 extends between the segment sealing flanges 44 and the segment locating flanges 46. The packing ring segments are disposed in a generally dovetail-shaped annular groove 50 within the diaphragm 14. The annular groove 50 is defined along the radially innermost portions of the diaphragm 14 by a pair of diaphragm locating flanges 52 which extend axially toward one another defining a slot 54 therebetween. The packing ring segments are positioned such that the axially reduced neck 48 of the packing ring segments is fitted within the diaphragm slot 54.

The spring loaded bar 30 (illustrated by hidden/dashed lines in FIGS. 3 and 4) extends radially inwardly beyond the segment locating flanges under a spring force from the spring 34. The bar has a pair of axially extending bar locating flanges 56 which extend from the bar in axially opposite directions away from one another. The bar 30 further includes a recessed portion 58 which provides a mating surface for one end of the spring 34. The cover plate 36 provides a mating surface for the other end of the spring 34. The spring 34 is a compression spring, which applies a resistive force as it is compressed. Therefore, when the spring 34 is installed between the bar 30 and the cover plate 34, the spring 34 urges the bar 30 to translate into its innermost radial position. When the packing ring is installed into the diaphragm, the bar locating flanges 56 contact the diaphragm locating flanges 52 and therefore the pressure from the spring is applied on to the cover plate 36 (which is fastened to the packing ring segment), thus resulting in a radial outward movement of the packing ring segment whichplaces the packing ring segment in the outermost large clearance (as shown in FIG. 3). When the packing ring segment is in the outermost large clearance position, a gap 60 is present between the segment locating flanges 46 and the diaphragm locating flanges 52.

To displace the packing ring segments into their closed smaller diameter position, a plurality of passages (not shown) are provided in the diaphragm or the packing ring segment to introduce a flowing medium, for example, steam, along the outer diameter 62 of the packing ring segments. The flowing medium exerts a radially inward pressure force along the outer diameter of the packing ring segment whereby the packing ring segment may be displaced inwardly toward the turbine shaft 12 against the bias of the springs 34 (as shown in FIG. 4). When the packing ring segment is in the innermost small clearance position, there in no gap present between the segment locating flanges 46 and the diaphragm locating flanges 52 as they are in direct contact with each other.

The springs 34 operate in a manner such that they have sufficient spring resistive force to maintain the large clearance position but are compressible within a desired range to allow the fluid pressure to overcome the spring pressure to maintain the small clearance position.

Figure 5:
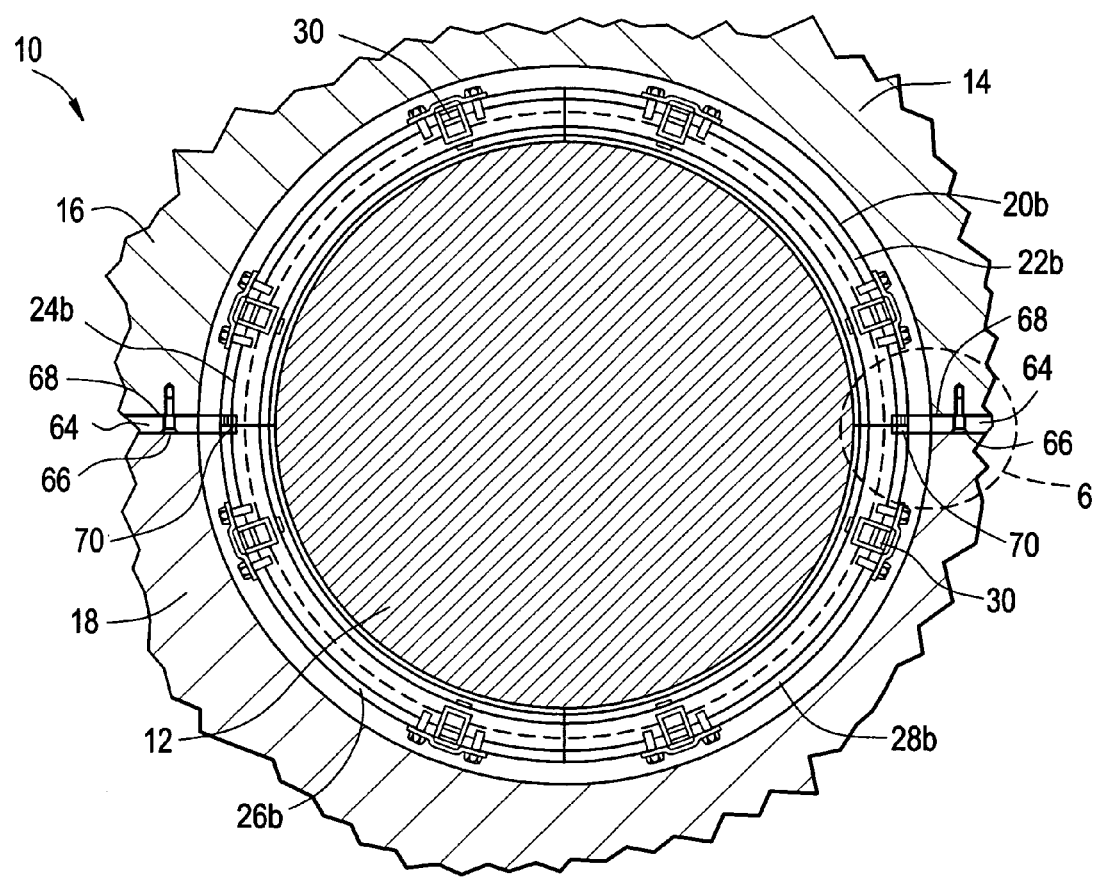
FIG. 5 is a section view of a portion of a steam turbine for use in accordance with an embodiment of the invention.
Figure 6:
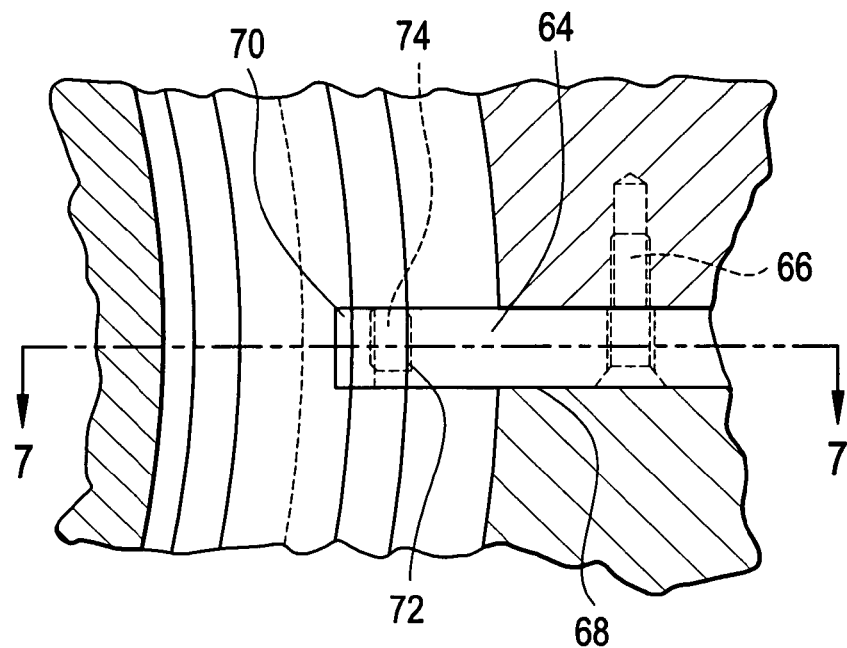
FIG. 6 is an enlarged view of the exemplary steam turbine of FIG. 5 for use in accordance with an embodiment of the invention.
Figure 7:
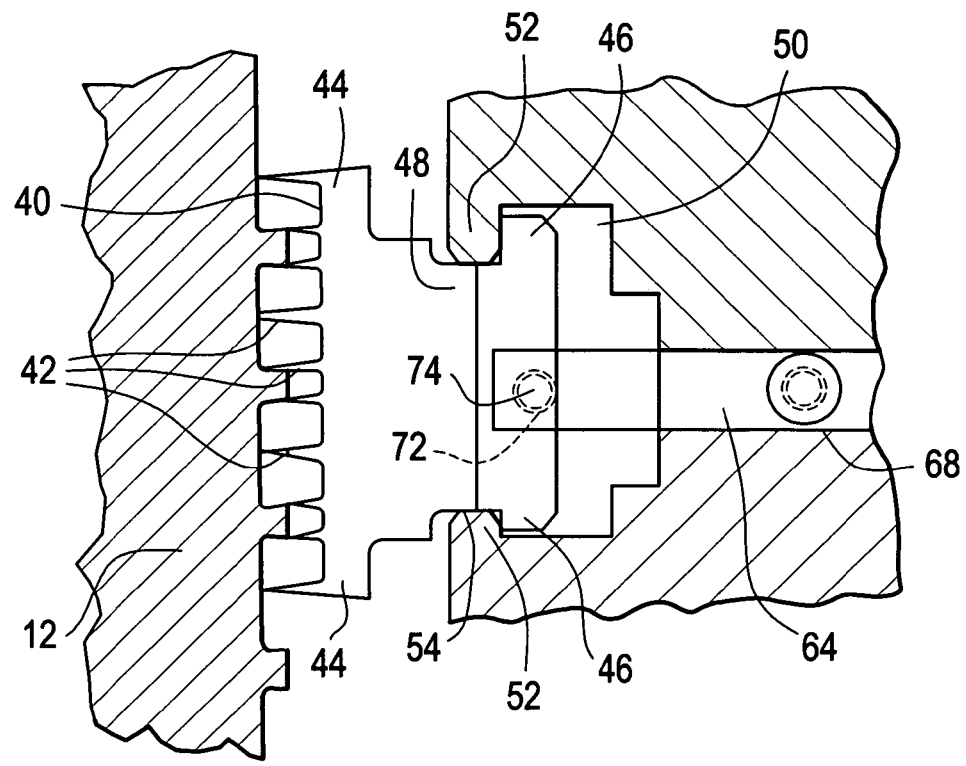
FIG. 7 is a cross-section view of the exemplary steam turbine of FIG. 6 for use in accordance with an embodiment of the invention.

In an alternative embodiment, the packing ring assembly may be arranged as illustrated in FIG. 5 wherein a packing ring assembly 20b, includes packing ring segments arranged such that a first packing ring segment 22b and a second packing ring segment 24b are disposed on a first side of a midline between the first diaphragm half 16 and the second diaphragm half 18, while a third packing ring segment 26b and a fourth packing ring segment 28b are disposed on a second side of the midline between the first diaphragm half 16 and the second diaphragm half 18. Additionally, a pair of seal keys 64 may be installed at the outermost radial positions of the packing ring segments at the midline between the first diaphragm half 16 and the second diaphragm half 18, as illustrated in FIGS. 5-7. The seal keys 64 are secured, for example, by bolts 66, to the first diaphragm half 16 in diaphragm slot 68 and projects radially inwardly to extend into packing ring segment slot 70 formed along an end, adjacent to the midline between the first diaphragm half 16 and the second diaphragm half 18, of each of the packing ring segments. In other words, each of the packing ring segments define one half of the packing ring segment slot 70, more specifically, the first 22b and fourth 28b packing ring segments define one segment slot 70 and the second 24b and third 26b packing ring segments define the other diametrically opposed segment slot 70.

The seal keys 64 support the first 22b and second 24b packing ring segments against circumferential displacement under gravity forces. The seal keys 64 further prevent the first 22b and second 24b packing ring segments from applying forces, resulting from circumferential displacement, on the third 26b and fourth 28b packing ring segments. The seal keys 64 contain the first 22b and second 24b packing ring segments within the first diaphragm half 16 and therefore the seal keys 64 also minimize the gap between the first 22b and second 24b packing ring segments. Additionally the seal keys 64 allow for horizontal displacement (the horizontal direction is defined as the horizontal plane of FIGS. 5 and 6 formed by the midline between the first and second diaphragm halves and the central axis of the turbine shaft 12) of the first 22b and second 24b segments while allowing radial displacement for the third 26b and fourth 28b segments. Radial displacement in the third 26b and fourth 28b packing ring segments allows for greater radial clearance at the lower half vertical centerline of the turbine shaft 12, where turbine shaft 12 bowing is the greatest.

The seal keys 64 further comprise a threaded hole 72 for engagement of a setscrew 74 (best illustrated in FIGS. 6 and 7). The threaded hole 72 is oriented such that adjustment of the setscrew 74 results in displacement of the first 22b or second 24b packing ring segment. As the setscrew 74 is adjusted to extend beyond the seal key 64, the exposed setscrew 74 end comes into contact with the packing ring segment and drives the packing ring segment circumferentially away from the seal key 64. Adjustment of the first 22b and/or second 24b packing ring segment allows for proper alignment of all packing ring segments into true center positions.

The above mentioned characteristics allow for the packing ring assemblies 20a (best illustrated in FIG. 1) and 20b (best illustrated in FIG. 5) to be entirely enclosed in their respective diaphragm halves thus preventing assembly problems. Additionally, the spring loaded bar and its associated mating components are self contained within the packing ring assemblies 20*a* and 20*b*. Further, the packing ring assemblies 20*a* and 20*b* may be installed and utilized with any existing dovetail size and any existing diaphragm assembly. Therefore, the packing ring assemblies 20*a* and 20*b* may be installed in existing industrial steam turbines with little or no modification to diaphragm components. Additionally, the packing ring assemblies 20*a* and 20*b* may be retrofitted into existing steam turbines. The packing ring assemblies 20*a* and 20*b* may be provided as a kit having the desired parts and hardware to easily remove the existing packing ring assembly from the diaphragm and replace it with the packing ring assembly 20*a* or 20*b*, with little or no modifications to the diaphragm, at a maintenance interval or overhaul of the steam turbine.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A packing ring assembly comprising:
   a packing ring segment having an axial slot;
   a bar disposed within the slot;
   a cover plate disposed along an outer periphery of the packing ring segment;
   a spring compressed between the bar and the cover plate; and
   an affixation which secures the cover plate to the packing ring segment.

2. The packing ring assembly of claim 1 wherein the packing ring segment moves between an innermost small clearance position and an outermost large clearance position in relation to a rotary component.

3. The packing ring assembly of claim 2 wherein the spring applies a resistive force between the bar and the cover plate while the packing ring segment is in the outermost large clearance position.

4. The packing ring assembly of claim 3 wherein a flowing medium exerts a force on the packing ring segment, which overcomes the spring resistive force, and moves the packing ring segment to the innermost small clearance position.

5. The packing ring assembly of claim 4 wherein the flowing medium is steam.

6. A packing ring assembly comprising:
   a first packing ring segment having a spring loaded bar disposed within a first half of a stationary component;
   a second packing ring segment having a spring loaded bar disposed within the first half of the stationary component adjacent to the first packing ring segment; and,
   one or more seal keys disposed at a midline between the first half and the second half of the stationary component wherein each of the seal keys supports the first or second packing ring segment.

7. The packing ring assembly of claim 6 wherein the spring loaded bar applies a force on to the stationary component resulting in movement of the packing ring segment between an innermost small clearance position and an outermost large clearance position in relation to a rotary component.

8. The packing ring assembly of claim 7 further comprising a cover plate securing the spring loaded bar within the packing ring assembly.

9. The packing ring assembly of claim 6 wherein each of the one or more seal keys is fastened to the first half of the stationary component.

10. The packing ring assembly of claim 6 wherein each of the one or more seal keys further comprises a threaded hole, adjacent to the first or second packing ring segment, and a set screw engaged with the threaded hole.

11. A steam turbine comprising:
    a shaft;
    a stationary component; and
    a packing ring assembly extending around the shaft, the packing ring assembly including:
      a spring loaded bar in contact with the stationary component,
      a cover plate; and
      a spring compressed between the spring loaded bar and the cover plate, the spring retained between the spring loaded bar and the cover plate by an affixation.

12. The steam turbine of claim 11 wherein the packing ring assembly further comprises a plurality of packing ring segments each having one or more spring loaded bars.

13. The steam turbine of claim 12 wherein the spring loaded bar applies a force on to the stationary component resulting in movement of the packing ring segment between an innermost small clearance position and an outermost large clearance position in relation to a rotary component.

* * * * *